(12) United States Patent
Herhusky et al.

(10) Patent No.: US 10,940,829 B1
(45) Date of Patent: Mar. 9, 2021

(54) METHOD FOR OPERATING A VEHICLE HAVING AN ELECTRICAL OUTLET

(71) Applicant: Ford Global Technologies, LLC, Dearborn, MI (US)

(72) Inventors: Nicholas Herhusky, Dearborn, MI (US); Scott Steadmon Thompson, Belleville, MI (US); John Eric Rollinger, Troy, MI (US); Adam J. Richards, Canton, MI (US); Vincent Martinez, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/562,287

(22) Filed: Sep. 5, 2019

(51) Int. Cl.
  *F16H 61/22* (2006.01)
  *B60R 25/00* (2013.01)
  *B60Q 9/00* (2006.01)
  *F16H 61/16* (2006.01)

(52) U.S. Cl.
  CPC .............. *B60R 25/003* (2013.01); *B60Q 9/00* (2013.01); *F16H 61/16* (2013.01); *F16H 61/22* (2013.01)

(58) Field of Classification Search
  None
  See application file for complete search history.

(56) References Cited

U.S. PATENT DOCUMENTS

| | | | | |
|---|---|---|---|---|
| 8,393,423 | B2 * | 3/2013 | Gwozdek | B60W 10/182 180/65.27 |
| 8,863,870 | B2 * | 10/2014 | Gwozdek | B60W 10/182 180/65.31 |
| 10,752,251 | B2 * | 8/2020 | Sjodin | B60W 10/08 |
| 2010/0320964 | A1 * | 12/2010 | Lathrop | B60L 53/30 320/109 |

* cited by examiner

*Primary Examiner* — Dirk Wright
(74) *Attorney, Agent, or Firm* — Geoffrey Brumbaugh; McCoy Russell LLP (57) ABSTRACT

A method for operating a vehicle that includes an electrical power output is described. In one example, the method includes preventing shifting of transmission gears in response to an external electric power consumer being coupled to an electrical power output receptacle of the vehicle. The method may reduce a possibility of interrupting electrical power that may be supplied to the external electric power consumer.

20 Claims, 5 Drawing Sheets

FIG. 7

METHOD FOR OPERATING A VEHICLE HAVING AN ELECTRICAL OUTLET

FIELD

The present description relates to methods and a system for operating a vehicle that may supply electrical power to an external device. The methods and systems may reduce the possibility of an unexpected power disconnect to the external device.

BACKGROUND AND SUMMARY

A vehicle may include an electrical power outlet to provide electrical power to electrically operated devices that are external to the vehicle or that are not integrated into the vehicle. The power may be provided via an integrated starter/generator, a belt integrated starter generator, or another electric machine that is incorporated into the vehicle. The electrical power outlet may have sufficient capacity to operate entertainment devices, hand tools, lights, pumps, and other electrically operated devices. The electric power outlet may supply electric power to external devices when the vehicle is moving or when the vehicle is stationary. If the vehicle is supplying power to an external device when the vehicle is stationary, electrical power delivered to the external device may be interrupted if vehicle driver (e.g., human or autonomous) drives away while the external device is connected to the vehicle electrical power outlet. Consequently, operation of the external device may be interrupted, which may cause users of the external electrically operated device to become frustrated. Therefore, it may be desirable to reduce the possibility of interrupting power delivery to an external electrical power consumer.

The inventors herein have recognized the above-mentioned issues and have developed a vehicle operating method, comprising: preventing forward or reverse motion of vehicle wheels in response to an external electrical power consumer being coupled to a vehicle via an electric receptacle of the vehicle.

By preventing movement of a vehicle in response to an external electrical power consumer being coupled to a vehicle, it may be possible to provide the technical result of avoiding interruption of electric power flow to external electric power consumers. Consequently, the external electric power consumer may enjoy uninterrupted operation. However, for cases where it may be desirable for the external power consumer to move with the vehicle, the inhibiting of forward and reverse wheel rotation may be overridden via a dedicated input so that the external electric power consumer may remain operational when the vehicle is traveling on a road.

The present description may provide several advantages. Specifically, the approach may reduce a possibility of unintended electric power flow disruptions to external electric power consumers. The approach may also be overridden to provide system flexibility when it may be desired to operate the external electric power consumer while the vehicle to which it is electrically coupled is traveling. In addition, the approach is flexible and may be applied to a variety of driveline configurations.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
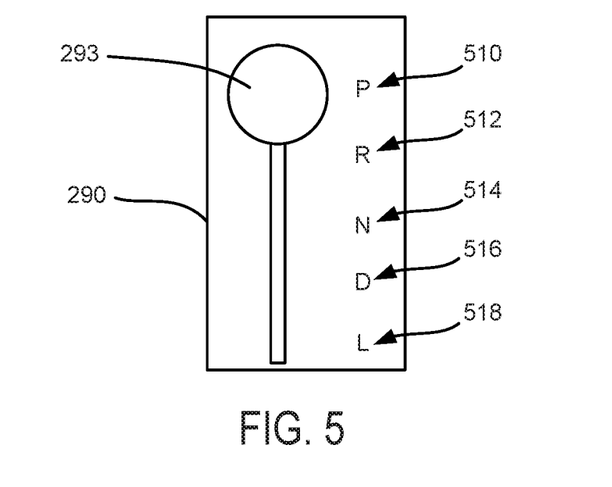
FIGS. 5-7 show several different shifter configurations.
Figure 6:
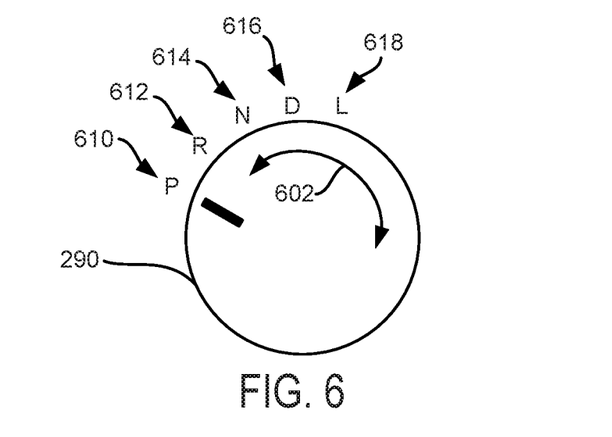
Figure 7:
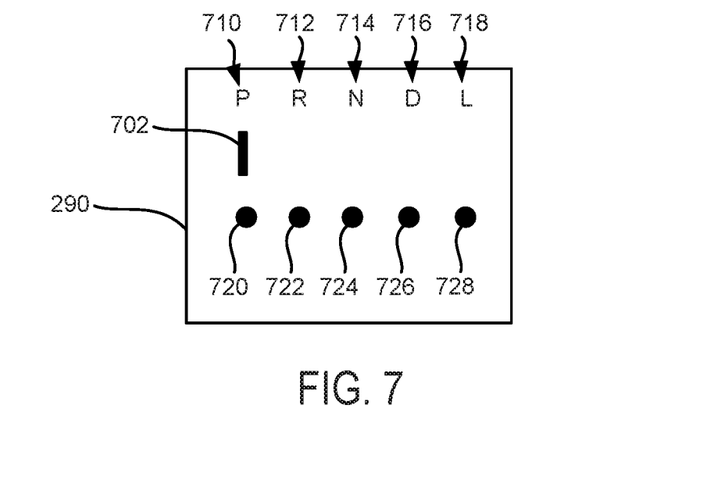

The present description is related to operating a vehicle and driveline that may supply electrical power to an external (e.g., off board) electrical power consumer. The vehicle may include an engine may be of the type shown in FIG. 1. The engine may be included in a driveline or powertrain as shown in FIG. 2. The driveline and vehicle electric system may supply power to an electric power consumer according to the sequence shown in FIG. 3 and the method of FIG. 4. A method for operating a vehicle having an electrical power outlet is shown in FIG. 4. Several different example shifter or drive engagement devices are shown in FIGS. 5-7.

Figure 1:
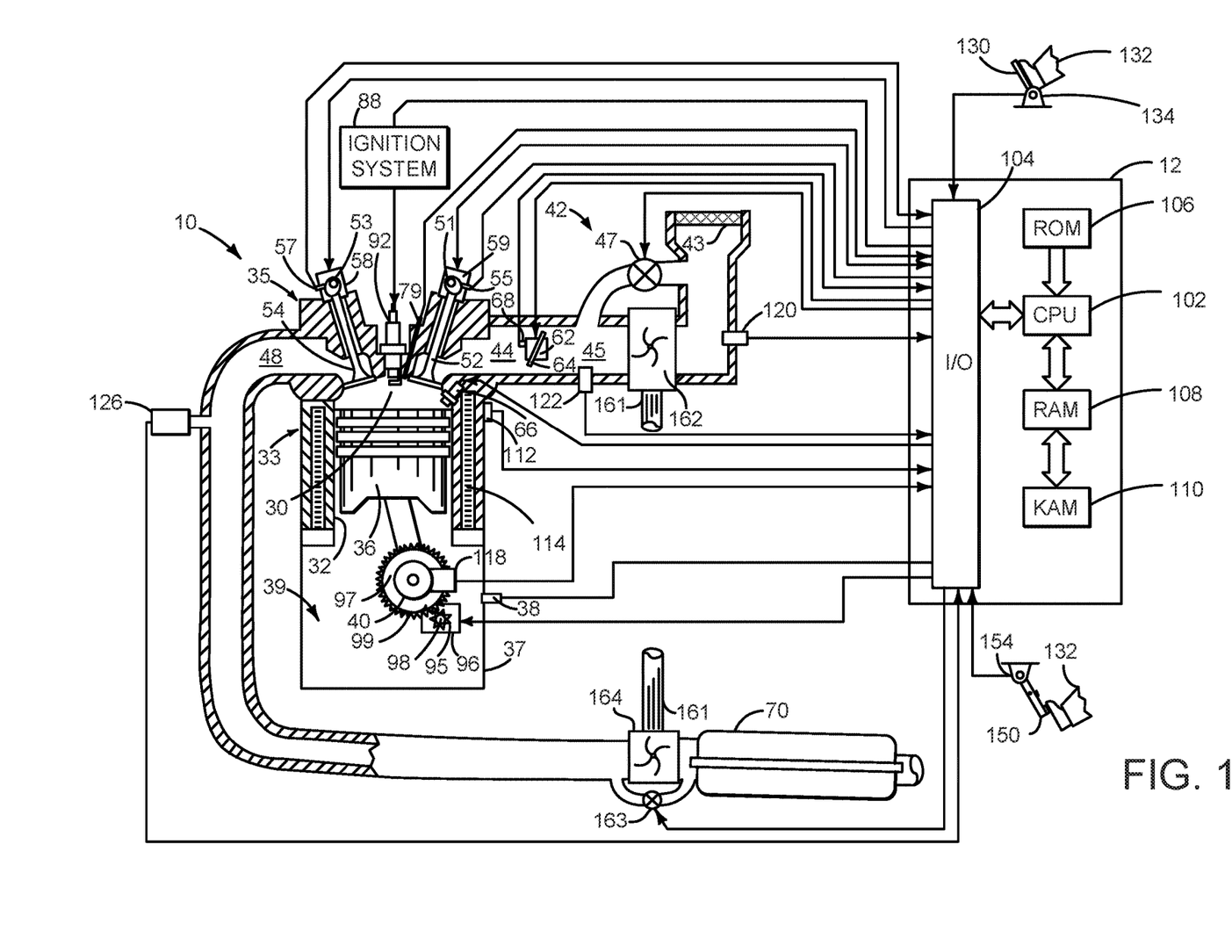
FIG. 1 shows a schematic diagram of an internal combustion engine.
Figure 2:
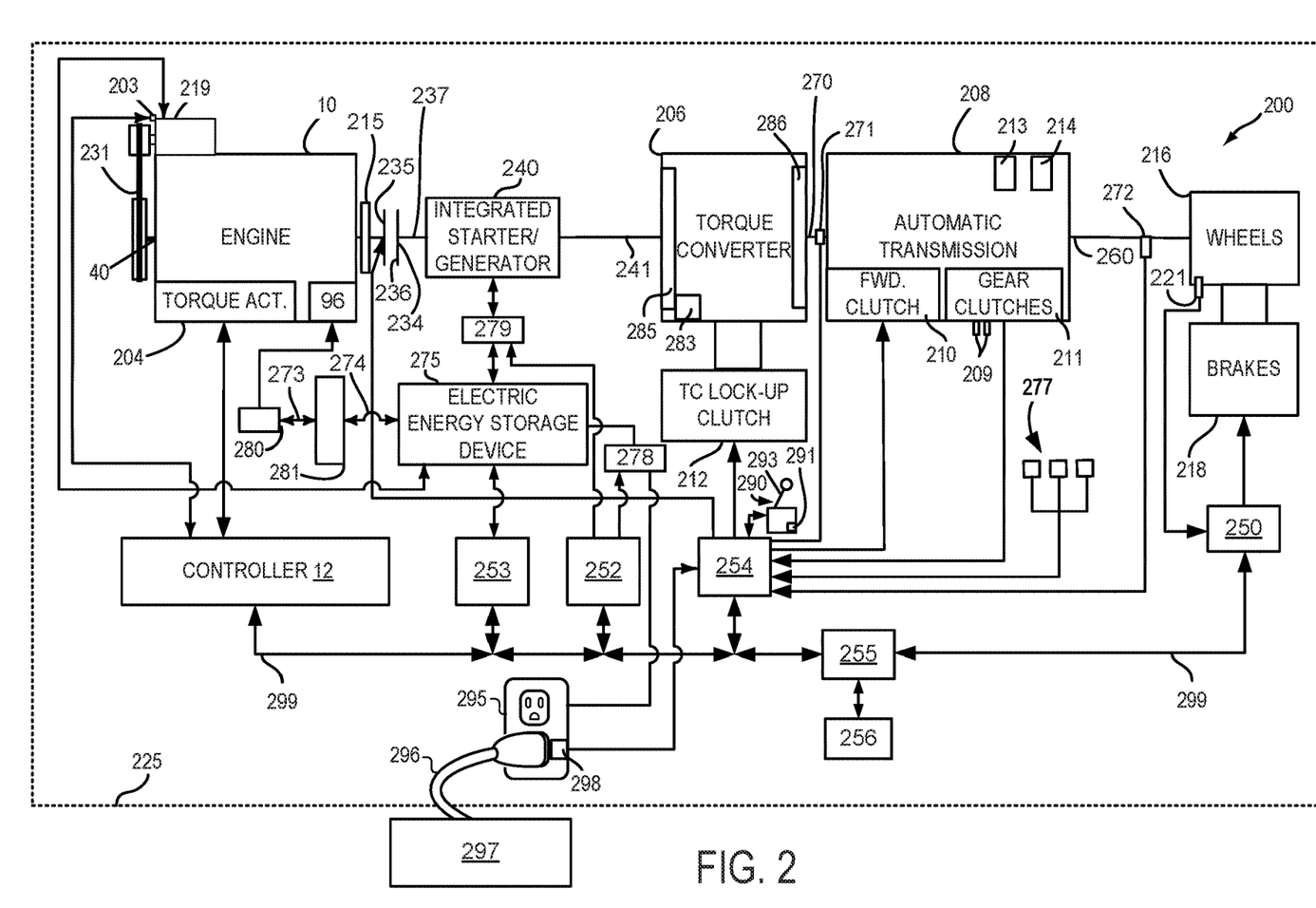
FIG. 2 shows a schematic diagram of an example vehicle driveline or powertrain including the internal combustion engine shown in FIG. 1.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. A phase or position of intake valve 52 may be adjusted relative to a position of crankshaft 40 via valve phase changing device 59. A phase or position of exhaust valve 54 may be adjusted relative to a position of crankshaft 40 via valve phase changing device 58. Valve phase changing devices 58 and 59 may be electro-mechanical devices, hydraulic devices, or mechanical devices.

Engine 10 includes a crankcase 39 that houses crankshaft 40. Oil pan 37 may form a lower boundary of crankcase 39 and engine block 33 and piston 36 may constitute an upper boundary of crankcase 39. Crankcase 39 may include a crankcase ventilation valve (not shown) that may vent gases to combustion chamber 30 via intake manifold 44. Pressure in crankcase 39 may be sensed via pressure sensor 38. Alternatively, pressure in crankcase 39 may be estimated.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; cylinder pressure from pressure sensor 79; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

Vehicle controller 255 and/or engine controller 12 may also receive input from human/machine interface 256. In one example, human/machine interface 256 may be a touch input display panel. Alternatively, human/machine interface 256 may be a key switch or other known type of human/machine interface. Human/machine interface 256 may receive requests from a user. For example, a user may request an engine stop or start via human/machine interface 256. Further, a user may override inhibiting of motion of wheels 216 when external electric power consumer 297 is coupled to vehicle 255. Additionally, human/machine interface 256 may display status messages and engine data that may be received from controller 255.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via torque actuator 204, such as a fuel injector, throttle, etc.

BISG 219 is mechanically coupled to engine 10 via belt 231. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 may selectively supply electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275 via inverter 279. Inverter 279 may convert direct current (DC) electric power from electric energy storage device 275 into alternating current (AC) electric power for operating ISG 240. Alternatively, inverter 279 may converter AC power from ISG 240 into DC power for storing in electric energy storage device 275. Inverter 279 may be controlled via electric machine controller 252. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Inverter 278 is shown electrically coupled to electric energy storage device 275 and electrical output receptacle 295. Inverter 278 may convert DC power to AC power for operating external electric power consumer 297 (e.g., hand tools, entertainment systems, lighting, pumps, etc.). Inverter 278 may convert electric power from low voltage battery 280, electric power from electric energy storage device 275, or electric power from ISG 240 or BISG 219 into electric power that is delivered to electrical output receptacle 295. External electric power consumer 297 may be located off-board vehicle 225 or they may be added to vehicle 225. External power consumer 297 may be electrically coupled to electrical output receptacle 295 via power cord 296. External electric power consumer sensor 298 may detect the presence or absence of external power consumer 297. Electric power consumer sensor 298 may physically sense the presence of cord 296 via a switch input, or alternatively, sensor 298 may be a current sensor and detect electric current flow out of electrical output receptacle 295 to determine the presence or absence of external power consumer 297.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power that is directly delivered to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches 211 and forward clutch 210 for selectively engaging and disengaging forward gears 213 (e.g., gears 1-10) and reverse gear 214. Automatic transmission 208 is a fixed ratio transmission. Alternatively, transmission 208 may be a continuously variable transmission that has a capability of simulating a fixed gear ratio transmission and fixed gear ratios. In still other examples, transmission 208 may be a fixed ratio transmission or a planetary gear set. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park). Shift selector 290 shift lever 293 may be prevented from moving via a solenoid actuator 291 that selectively prevents shift lever 293 from moving from park or neutral into reverse or a forward gear position (e.g., drive).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a vehicle system, comprising: an engine; a transmission coupled to the engine; an electrical power source; an electrical output receptacle coupled to the electrical power source; and a controller including executable instructions stored in non-transitory memory to inhibit shifting of gears of the transmission in response to an external electrical power consumer being coupled to the electrical output receptacle. The vehicle system further comprises additional instructions to override the inhibiting of shifting the gears of the transmission. The vehicle system further comprises additional instructions to cancel the overriding of the inhibiting of shifting the gears of the transmission in response to deactivating a vehicle. The vehicle system includes where inhibiting shifting of the gears of the transmission includes preventing movement of a shifter. The vehicle system includes where the preventing movement of the shifter includes activating a solenoid to prevent motion of the shifter.

Figure 3:
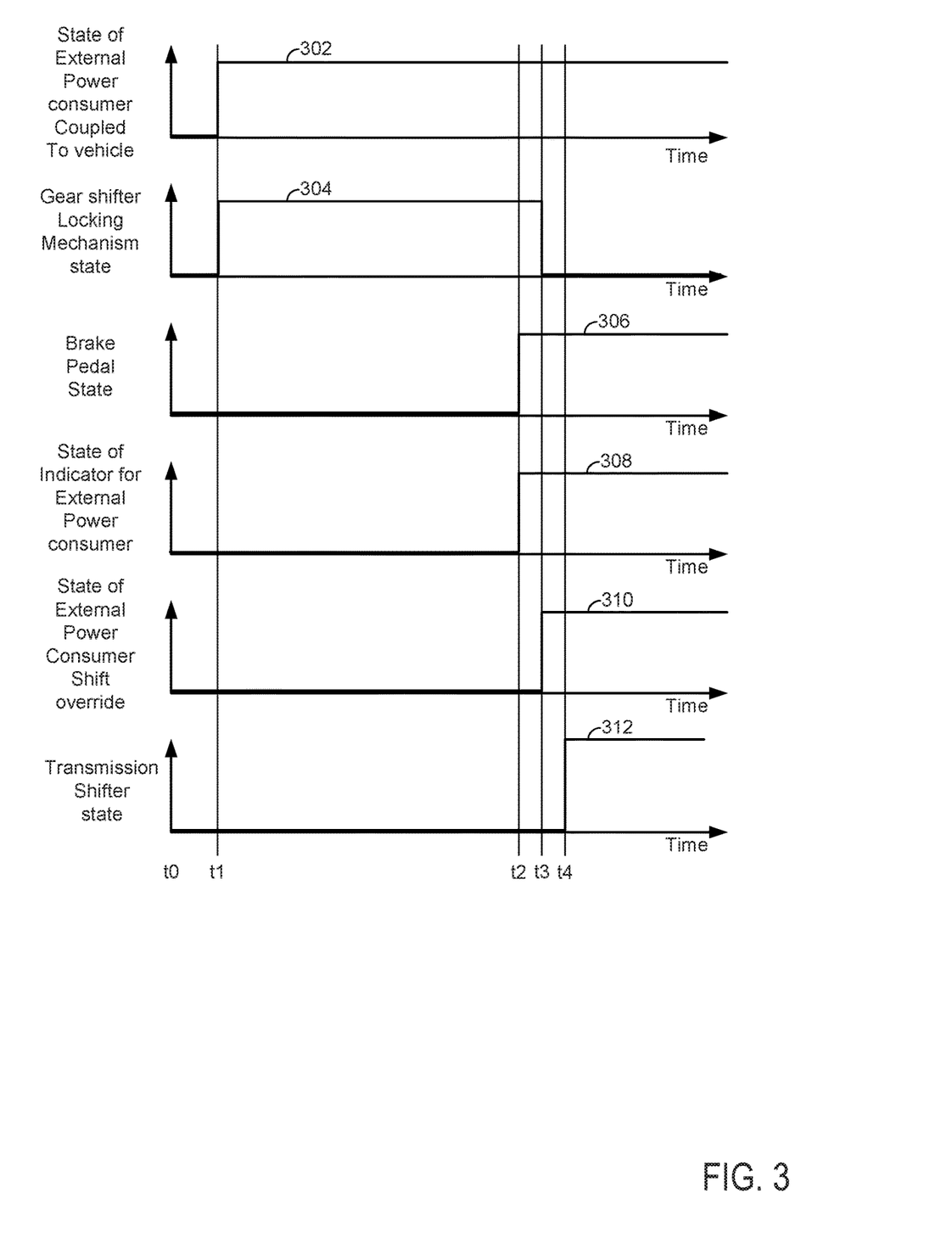
FIG. 3 shows plots of an example vehicle operating sequence according to the method of FIG. 4.
Figure 4:
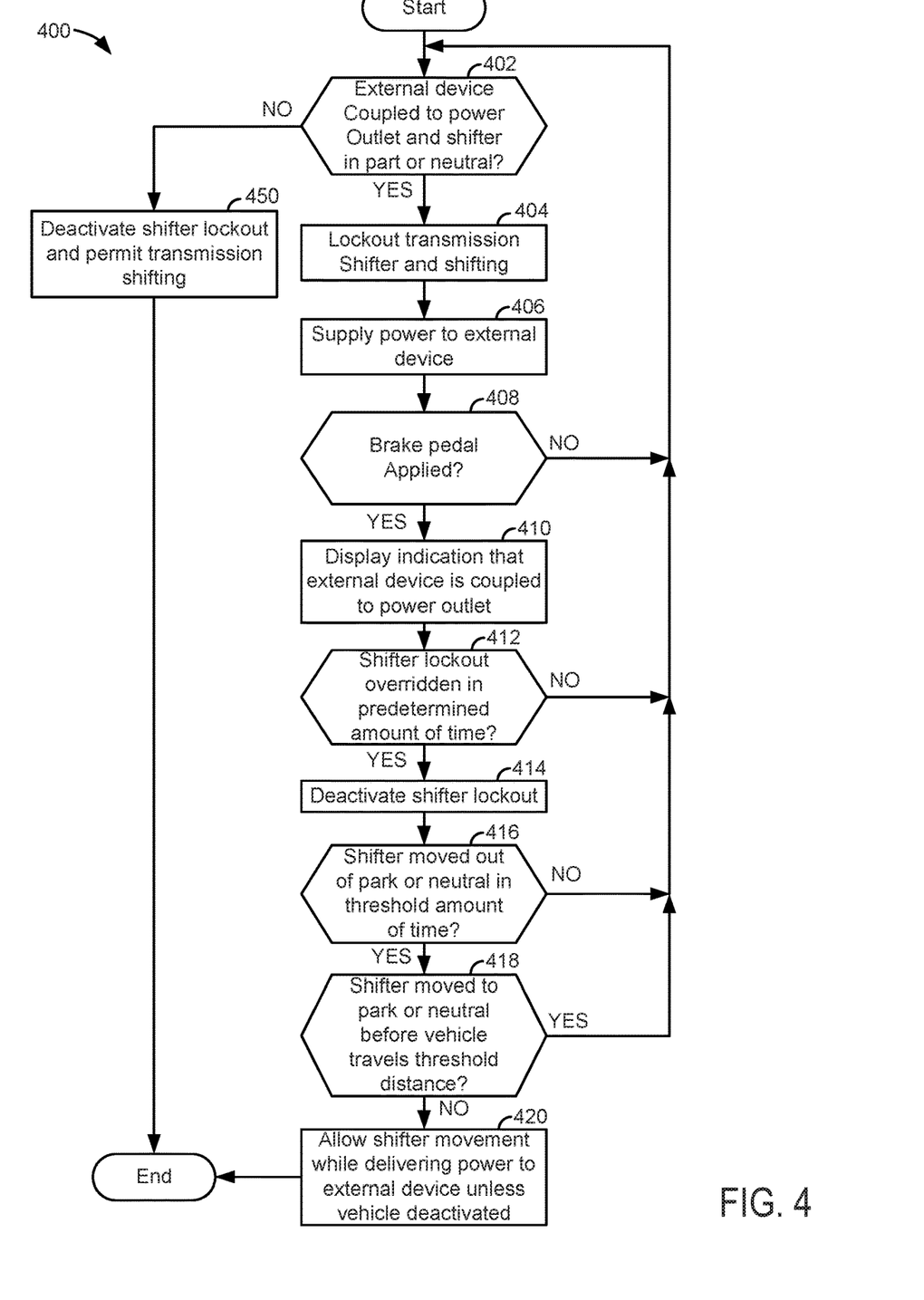
FIG. 4 shows an example method for operating a vehicle.

Referring now to FIG. 3, a vehicle operating sequence according to the method of FIG. 4 is shown. The vehicle operating sequence of FIG. 3 may be provided via the system of FIGS. 1 and 2 in cooperation with the method of FIG. 4. The plots shown in FIG. 3 are time aligned and occur at the same time. The vertical lines represent times of interest during the sequence.

The first plot from the top of FIG. 3 is a plot of a state indicating whether or not an external electric power consumer is electrically coupled to a vehicle via an electric output receptacle of the vehicle versus time. The vertical axis represents the state of the external electric power consumer electrical coupling to the vehicle. The external electric power consumer is electrically coupled to the vehicle when trace 302 is at a higher level near the vertical axis arrow. The external electric power consumer is not electrically coupled to the vehicle when trace 302 is at a lower level near the horizontal axis. Trace 302 represents the state of the external electric power consumer electric coupling to the vehicle.

The second plot from the top of FIG. 3 is a plot of a gear shifter locking mechanism state versus time. The vertical axis represents the gear shifter locking mechanism state. The gear shifter locking mechanism prevents shifter movement when trace 304 is at a higher level near the vertical axis arrow. The gear shifter locking mechanism allows shifter movement when trace 304 is at a lower level near the horizontal axis. Trace 304 represents the gear shifter locking mechanism state.

The third plot from the top of FIG. 3 is a plot of a brake pedal state versus time. The vertical axis represents the brake pedal state. The brake pedal is applied (e.g., depressed) when trace 306 is at a higher level near the vertical axis arrow. The brake pedal is not applied when trace 306 is at a lower level near the horizontal axis. Trace 306 represents the brake pedal operating state.

The fourth plot from the top of FIG. 3 is a plot of state of an indicator for an external electric power consumer being coupled to the vehicle versus time. The vertical axis represents the state of the indicator for the external power consumer being coupled to the vehicle. An indicator, such as a human/machine interface, is indicating that an external electric power consumer is electrically coupled to the vehicle when trace 308 is at a higher level near the vertical axis arrow. The indicator is not indicating that an external electric power consumer is electrically coupled to the vehicle when trace 308 is at a lower level near the horizontal axis. Trace 308 represents the indicator operating state.

The fifth plot from the top of FIG. 3 is a plot of a state of an external electric power consumer shift override versus time. The vertical axis represents the state of an external electric power consumer shift override. The external electric power consumer shift override is activated (e.g., forward and reverse wheel rotation is prevented) when trace 310 is at a higher level near the vertical axis arrow. The external electric power consumer shift override is not activated when trace 310 is at a lower level near the horizontal axis. Trace 310 represents the external electric power consumer shift override is activated.

The sixth plot from the top of FIG. 3 is a plot of a transmission shifter state versus time. The vertical axis represents the transistor shifter state. The transmission shifter is engaged in reverse or a forward gear when trace 312 is at a higher level near the vertical axis arrow. The transmission shifter is engaged in park or neutral when trace 312 is at a lower level near the horizontal axis. Trace 312 represents the transmission shifter state.

At time t0, an external electrical power consumer is not electrically coupled to the vehicle and the gear shifter locking mechanism (e.g., 291 of FIG. 2) is not engaged to prevent changes in the gear shifter operating state. The vehicle brake pedal is not applied and the indicator for the external electric power consumer is not indicating that the external electric power consumer is electrically coupled to the vehicle. The external electric power consumer shift override is not activated and the transmission shifter is engaged in park.

At time t1, an external electrical power consumer is electrically coupled to the vehicle via the electrical output receptacle as indicated by the state of the external power consumer coupled to the vehicle. The controller engages the shift lock as indicated by the gear shifter locking mechanism state changing from a lower level to a higher level. The vehicle brake pedal is not applied and the indicator for the external electric power consumer is not indicating that the external electric power consumer is electrically coupled to the vehicle. The external electric power consumer shift override is not activated and the transmission shifter is engaged in park. Forward and reverse wheel motion is prevented by having the gear shifter locking mechanism engaged between time t1 and time t2.

At time t2, the vehicle's driver (human or autonomous) engages the vehicle brake. The controller then provides an indication that an external electrical power consumer is electrically coupled to the vehicle as indicated by the indicator for the external electric power consumer indicating that the external electric power consumer is electrically coupled to the vehicle. The gear shifter locking mechanism remains engaged to prevent forward and reverse wheel motion. The transmission shifter remains in park and the external electrical power consumer shift override is not activated.

At time t3, the external electrical power consumer shift override is activated via the vehicle's driver (not shown). The external electrical power consumer remains electrically coupled to the vehicle and the gear shifter locking mechanism is disengaged in response to the external electrical power consumer shift override being activated. This allows the driver to shift into a forward or reverse gear, which allows the vehicle wheels to rotate in a forward or reverse direction. The brake pedal is still applied and the indicator for the external electrical power consumer continues to indicate that the external electrical power consumer is electrically coupled to the vehicle. The transmission shifter remains engaged in park.

At time t4, the vehicle's driver changes the state of the shifter from park into drive as indicated by the transmission shifter state changing from a lower level to a higher level. The external electrical power consumer remains electrically coupled to the vehicle and the gear shifter locking mechanism remains disengaged in response to the external electrical power consumer shift override being activated. The brake pedal is still applied and the indicator for the external electrical power consumer continues to indicate that the external electrical power consumer is electrically coupled to the vehicle.

In this way, vehicle wheels may be prevented from moving in forward or reverse directions via locking out a transmission shifter. However, if a human or autonomous driver overrides the lockout, then the wheels may rotate in a reverse or forward direction. This may reduce the possibility of unintended disruptions of electrical power to external electric power consumers.

Referring now to FIG. 4, a method for operating a vehicle is shown. At least portions of method 400 may be implemented as executable controller instructions stored in non-transitory memory. Method 400 may operate in cooperation with the system of FIGS. 1 and 2. Additionally, portions of method 400 may be actions taken in the physical world to transform an operating state of an actuator or device. The method of FIG. 4 may be incorporated into the system of FIGS. 1 and 2 as executable instructions stored in non-transitory memory.

At 402, method 400 judges whether or not an external electrical power consumer is electrically coupled to the vehicle. In one example, method 400 may judge that an external electrical power consumer is electrically coupled to the vehicle when current is measured exiting the vehicle's electric power receptacle via a current sensor. In another example, the presence or absence of power cord 296 may be sensed via a switch input. If method 400 judges that an external electrical power consumer is electrically coupled to the vehicle, the answer is yes and method 400 proceeds to 404. Otherwise, the answer is no and method 400 may proceed to 450.

At 450, method 400 deactivates the shifter lockout and permits transmission gear shifting. In examples where the vehicle may enter a forward or reverse propulsion mode to rotate the vehicle's wheels without shifting gears, method 400 allows the propulsion source (e.g., engine and/or electric machine) to deliver torque to the vehicle's wheels. Further, method 400 permits the propulsion source to deliver driver demanded torque to vehicle wheels. Method 400 proceeds to exit.

At 404, method 400 locks out the transmission shifter and prevents transmission shifting. In one example, the transmission shifter lever may be held in a park position or a neutral position via a solenoid to prevent engagement of forward or reverse gears. Thus, the vehicle may be held in park or neutral and not allowed to shift into reverse or drive, thereby inhibiting motion of the vehicle's wheels in a reverse or forward direction. In examples where the transmission does not include gears (e.g., a planetary gear set or a continuously variable transmission), method 400 prevents torque from propulsion sources from reaching the vehicle's wheels. In one example, method 400 may prevent electrical current flow to an electric machine via an inverter. In another example, method 400 may hold a driveline disconnect in a fully open state to prevent engine torque from reaching the vehicle's wheels. In another example, method 400 controls output of a gearbox such that propulsion torque may not exit the gearbox. Thus, method 400 may be implemented in a variety of ways and in a variety of driveline configurations that are not shown herein without extending beyond the scope of the disclosure. Method 400 proceeds to 406 after locking out the shifter and/or preventing torque from propulsion sources reaching the vehicle's wheels.

At 406, method 400 supplies electrical power to an external electrical power consumer via the vehicle's electrical output receptacle. In one example, the electrical power may be provided via an inverter. In other examples, the electrical output may be provided via electrically coupling output of an alternator or generator on board the vehicle to the electrical output receptacle. Method 400 proceeds to 408.

At 408, method 400 judges whether or not a brake pedal is applied. In some examples, the brake pedal must be applied for the vehicle to be shifted into a mode where torque is delivered to the vehicle's wheels. For example, the brake pedal must be applied before the transmission shifter may be moved from a park or neutral state to a reverse or drive state. Thus, the brake pedal may signal intent of the driver to move the vehicle. If method 400 judges that the brake pedal is applied or if another indication of a driver's intent to move the vehicle is asserted, then the answer is yes and method 400 proceeds to 410. Otherwise, the answer is no and method 400 returns to 402.

At 410, method 400 displays an indication that the vehicle is locked out of shifting transmission gears and/or delivering propulsion source power to vehicle wheels. In one example, method 400 may display a message to a human/machine interface. In other examples, method 400 may deliver a message to an autonomous driver. The indication may state that an external electrical power consumer is electrically coupled to the vehicle and that vehicle movement is locked out or prevented, but the lockout may be overridden. Method 400 proceeds to 412.

At 412, method 400 judges whether or not a human driver or an autonomous driver has provided input to override the prevention or lockout of propulsion source torque delivery to the vehicle's wheels. In one example, a human driver may request overriding of the lockout via input to the human/machine interface. An autonomous driver may send a control signal to the vehicle controller to request overriding of the lockout mode. If method 400 judges that overriding of the lockout mode has been requested, the answer is yes and method 400 proceeds to 414. In some examples, method 400 may require that the human driver or the autonomous driver request the override of the lockout within a predetermined or threshold amount of time since the most recent time that the brake pedal was first applied without being released to proceed to 414, otherwise the answer is no and method 400 returns to 402. However, if the vehicle is deactivated (e.g., a human driver commands the vehicle off such that power may not be delivered to the vehicle's wheels via a propulsion source and the propulsion sources may also be deactivated via ceasing to supply energy to the propulsion sources), then method 400 may not permit the override condition to continue so that if an external electrical power consumer is coupled to the vehicle and the vehicle is reactivated, prevention of vehicle movement may no longer be overriding until the driver overrides the prevention of vehicle movement via the override input.

At 414, method 400 deactivates the transmission shifter lockout and allows transmission shifting. The transmission shifter lever may be release and allowed to exit the park position or the neutral position via releasing the solenoid. In examples where the transmission does not include gears (e.g., a planetary gear set or a continuously variable transmission), method 400 allows torque from propulsion sources to reach the vehicle's wheels. In one example, method 400 may allow electrical current flow to an electric machine via an inverter. In another example, method 400 may close a driveline disconnect to allow engine torque to reach the vehicle's wheels. Method 400 proceeds to 416 after unlocking the shifter lockout and/or allowing torque from propulsion sources to reach the vehicle's wheels.

At 416, method 400 method 400 judges whether if the shifter has move from park or neutral to a forward or reverse gear in less than a threshold amount of time since the most recent time that the brake pedal was applied. If so, the answer is yes and method 400 proceeds to 418. Otherwise, the answer is no and method 400 returns to 402. Method 400 may determine the position of the shifter via a shifter position sensor. Alternatively, method 400 may determine if a shift selector has changed operating state from indicating park or neutral to indicating drive or neutral within a threshold amount of time since most recently applying the brake pedal. If so, method 400 proceeds to 418. Otherwise, method 400 returns to 402. The shift selector may be incorporated into the human/machine interface or it may be a shift by wire unit that does not require movement of a shift lever. In still another example, method 400 may judge if the vehicle has exited a stationary mode (e.g., park or neutral) and has entered a propulsion mode (e.g., reverse or drive) within a threshold amount of time since the most recent brake pedal application. If so, method 400 proceeds to 418. Otherwise, method 400 returns to 402.

At 418, method 400 judges if the shifter has returned to park or neutral after being shifted to reverse or a forward gear (e.g., drive) before the vehicle has traveled longer than a threshold distance. If so, the answer is yes and method 400 returns to 402. Otherwise, the answer is no and method 400 proceeds to 420. Alternatively, method 400 may judge if the vehicle has exited a forward or reverse propulsion mode and returned to park or neutral before the vehicle has driven a threshold distance since the most recent time the vehicle entered the forward or reverse propulsion mode. If so, the answer is yes and method 400 returns to 402. Otherwise, the answer is no and method 400 proceeds to 420.

At 420, method 400 allows the shifter to move while delivering electrical power to the external electrical power consumer unless the vehicle is deactivated (e.g., the propulsion sources are not supplied with energy). If the vehicle does not include a shifter and propulsion modes are changed via a human/machine interface, method 400 allows torque from the propulsion sources to the vehicle's wheels while delivering electrical power to the external electrical power consumer unless the vehicle is deactivated. Method 400 proceeds to exit.

In this way, power from propulsion sources may be inhibited or prevented from reaching vehicle wheels when an external electric power consumer is electrically coupled to the vehicle. However, a human or autonomous driver may override inhibiting propulsion torque from reaching vehicle wheels via a specific acknowledgement.

Thus, the method of FIG. 4 provides for a vehicle operating method, comprising: preventing forward or reverse motion of vehicle wheels in response to an external electrical power consumer being coupled to a vehicle via an electric receptacle of the vehicle. The method includes where preventing forward or reverse motion of the vehicle wheels includes preventing a transmission of the vehicle from engaging a forward or a reverse gear. The method includes where preventing forward or reverse motion of the vehicle wheels includes preventing torque delivery to vehicle wheels via an electric machine. The method includes where preventing forward or reverse motion of the vehicle wheels includes preventing torque delivery to vehicle wheels via an engine. The method includes where preventing forward or reverse motion of the vehicle wheels includes preventing a change in state of a shifter. The method includes where preventing the change in state of the shifter includes preventing changing of a position of the shifter. The method includes where preventing the change in state of the shifter includes preventing changing of a position indicator of the shifter.

The method of FIG. 4 also provides for a vehicle operating method, comprising: preventing forward or reverse motion of vehicle wheels in response to an external electrical power consumer being electrically coupled to a vehicle via an electric receptacle of the vehicle; and overriding the preventing of forward or reverse motion of the vehicle wheels to allow motion of the vehicle wheels in response to receiving input to an override input. The method includes where the override input is a human/machine interface. The method further comprises displaying an indication that the forward or reverse motion of the vehicle wheels is prevented in response to applying a brake pedal. The method includes where the overriding of the preventing of forward or reverse motion of the vehicle wheels is performed in a predetermined amount of time since a most recent application of a brake pedal or else the overriding is not permitted. The method further comprises reactivating the preventing of the forward or reverse motion of the vehicle wheels after overriding the preventing of the forward or reverse motion of the vehicle wheels in response to a shifter state not changing in a threshold amount of time. The method further comprises permitting shifting of gears of a transmission while delivering electric power to the external electric power consumer in response to overriding the preventing of forward and reverse motion of the vehicle wheels. The method further comprises cancelling the overriding in response to deactivating the vehicle. The method includes where preventing forward or reverse motion of the vehicle wheels is accomplished via restricting motion of a shifter.

In another representation, the method of FIG. 4 provides for a vehicle operating method, comprising: preventing movement of a shifter lever in response to an external electrical power consumer being coupled to a vehicle via an electric receptacle of the vehicle. The method includes where the shifter level is prevented from moving via a solenoid. The method further comprises deactivating the prevention of movement of the shifter lever in response to input to a human/machine interface.

Referring now to FIG. 5, an example transmission shifter is shown. In this example, transmission shifter 290 includes a shift lever 293 that may be physically moved to change transmission gears. Shift lever 293 may be moved from park position "P" 510 to reverse position "R" 512 so that vehicle wheels rotate in a reverse direction when supplied with power via a propulsion source. Shifter lever 293 may be moved from park to drive "D" 516 to engage a forward gear so that vehicle wheels rotate in a forward direction when supplied with power via a propulsion source. Shifter lever 293 may also be moved from park to low "L" 518 to engage a forward gear so that vehicle wheels rotate in a forward direction when supplied with power via a propulsion source. Alternatively, shifter lever 293 may be moved from neutral "N" 514 to reverse 512, drive 516, or low 518 so that the vehicle's wheels rotate in a forward or reverse direction. Shifter 293 may be prohibited from moving via solenoid 291 shown in FIG. 2.

Referring now to FIG. 6, a second example transmission shifter is shown. In this example, transmission shifter 290 is implemented as a rotary shifter that may move as indicated by arrow 602. Shifter 290 may be rotated from park position "P" 610 to reverse position "R" 612 so that vehicle wheels rotate in a reverse direction when supplied with power via a propulsion source. Shifter 290 may be rotated from park to drive "D" 616 to engage a forward gear so that vehicle wheels rotate in a forward direction when supplied with power via a propulsion source. Shifter 290 may be rotated from park to low "L" 618 to engage a forward gear so that vehicle wheels rotate in a forward direction when supplied with power via a propulsion source. Alternatively, shifter lever 290 may be moved from neutral "N" 614 to reverse 612, drive 616, or low 618 so that the vehicle's wheels rotate in a forward or reverse direction. Shifter 290 may be prohibited from moving via solenoid 291 shown in FIG. 2.

Referring now to FIG. 7, an example transmission shifter 290 that is included in human/machine interface 256 of FIG. 2 is shown. Transmission shifter 290 may be shown on a display and it may be shifted via pressing an area of the display. For example, shifter 290 may be shifted from park position "P" 710 to reverse position "R" 712 via pressing position selector 722 on the display. Shifter 290 may be shifted from park to drive "D" 716 via pressing position selector 726. Shifter 290 may be shifted from park to low "L" 718 to engage a forward gear so that vehicle wheels rotate in a forward direction when supplied with power via a propulsion source via pressing position selector 728. Alternatively, shifter 290 may be moved from neutral "N" 714 to reverse 712, drive 716, or low 718 so that the vehicle's wheels rotate in a forward or reverse direction.

Shifter 290 may be prohibited from moving to selections 710-718 via controller 255 preventing position selectors 720-728 from responding to a person pressing one of position selectors 720-728. Further, controller 255 may prevent transmission clutches and solenoids from responding to position selectors 720-728.

It should be noted that FIGS. 5-7 show only a few examples of shifters that may be inhibited without departing from the scope of this disclosure when an electrical energy consumer is electrically coupled to a vehicle. Further, the methods described herein may be applied to vehicles that include only an electric propulsion source, only an internal combustion engine, or vehicles that include both internal combustion engines and electric propulsion sources.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
preventing forward or reverse motion of vehicle wheels in response to an external electrical power consumer being coupled to a vehicle via an electric receptacle of the vehicle.

2. The method of claim 1, where preventing forward or reverse motion of the vehicle wheels includes preventing a transmission of the vehicle from engaging a forward or a reverse gear.

3. The method of claim 1, where preventing forward or reverse motion of the vehicle wheels includes preventing torque delivery to vehicle wheels via an electric machine.

4. The method of claim 1, where preventing forward or reverse motion of the vehicle wheels includes preventing torque delivery to vehicle wheels via an engine.

5. The method as claimed in claim 1, where preventing forward or reverse motion of the vehicle wheels includes preventing a change in state of a shifter.

6. The method of claim 5, where preventing the change in state of the shifter includes preventing changing of a position of the shifter.

7. The method of claim 5, where preventing the change in state of the shifter includes preventing changing of a position indicator of the shifter.

8. A vehicle operating method, comprising:
preventing forward or reverse motion of vehicle wheels in response to an external electrical power consumer being coupled to a vehicle via an electric receptacle of the vehicle; and
overriding the preventing of forward or reverse motion of the vehicle wheels to allow motion of the vehicle wheels in response to receiving input to an override input.

9. The method of claim 8, where the override input is a human/machine interface.

10. The method of claim 8, further comprising displaying an indication that the forward or reverse motion of the vehicle wheels is prevented in response to applying a brake pedal.

11. The method of claim 8, where the overriding of the preventing of forward or reverse motion of the vehicle wheels is performed in a predetermined amount of time since a most recent application of a brake pedal or else the overriding is not permitted.

12. The method of claim 8, further comprising reactivating the preventing of the forward or reverse motion of the vehicle wheels after overriding the preventing of the forward or reverse motion of the vehicle wheels in response to a shifter state not changing in a threshold amount of time.

13. The method of claim 8, further comprising permitting shifting of gears of a transmission while delivering electric power to the external electric power consumer in response to overriding the preventing of forward and reverse motion of the vehicle wheels.

14. The method of claim 13, further comprising cancelling the overriding in response to deactivating the vehicle.

15. The method of claim 8, where preventing forward or reverse motion of the vehicle wheels is accomplished via restricting motion of a shifter.

16. A vehicle system, comprising:
an engine;
a transmission coupled to the engine;
an electrical power source;
an electrical output receptacle coupled to the electrical power source; and
a controller including executable instructions stored in non-transitory memory to inhibit shifting of gears of the transmission in response to an external electrical power consumer being coupled to the electrical output receptacle.

17. The vehicle system of claim 16, further comprising additional instructions to override the inhibiting of shifting the gears of the transmission.

18. The vehicle system of claim 16, further comprising additional instructions to cancel the overriding of the inhibiting of shifting the gears of the transmission in response to deactivating a vehicle.

19. The vehicle system of claim 16, inhibiting shifting of the gears of the transmission includes preventing movement of a shifter.

20. The vehicle system of claim 19, where the preventing movement of the shifter includes activating a solenoid to prevent motion of the shifter.

* * * * *